United States Patent [19]

Kamel et al.

[11] Patent Number: 5,695,555

[45] Date of Patent: Dec. 9, 1997

[54] METHOD FOR THE PRODUCTION OF IMPROVED PAVING ASPHALT AND PRODUCT PREPARED THEREFROM

[75] Inventors: Nabil Kamel, Mississauga; Laverne Miller, Georgetown, both of Canada

[73] Assignee: Petro Canada, Calgary

[21] Appl. No.: 660,254

[22] Filed: Jun. 7, 1996

[51] Int. Cl.⁶ .................................................. C09D 195/00
[52] U.S. Cl. ........................................................ 106/279
[58] Field of Search .................................................. 106/279

[56] References Cited

U.S. PATENT DOCUMENTS

| | | |
|---|---|---|
| 1,782,186 | 11/1930 | Abson . |
| 5,284,509 | 2/1994 | Kamel et al. .................. 106/273.1 |
| 5,519,073 | 5/1996 | van der Werff et al. ............. 524/62 |

FOREIGN PATENT DOCUMENTS

| | | | |
|---|---|---|---|
| 1274301 | 5/1972 | United Kingdom ............. C10C 3/04 |
| 1559083 | 1/1980 | United Kingdom ............. C08L 95/00 |

OTHER PUBLICATIONS

*Bituminous Materials in Road Construction*, (1962) no month avail. p. 142.

'Asphalt Mix Design', *Developments in Highway Pavement Engineering*, Part 1, (1978) no month avail. Applied Science Publishers, p. 102.

Research Disclosure No. 142, (Feb. 1976) 14213.

*Bituminous Materials*: Asphalts, Tars and Pitches, vol. II: Asphalts, Part 1, (1965) no month avail. pp. 101–105.

Dipl.—Ing Schuscha, Speziell geblasene Bitumen in Asphaltstraßenbau, Das Stutionare Mischwerk, (May 1976), pp. 220–231 (translation attached).

M.J. White, *Bituminous Materials —Types, Compositions, and Characteristics*, (1988) no month avail. Residential Course in Flexible Pavements and Bituminous Materials, University of Newcastle Upon Tyne, Dept of Civil Engineering, Lecture D, Sep. 11–16, pp. D1–D7, D13.

Kirk–Othmer *Encyclopedia of Chemical Technology*, 3rd ed., (1978) no month avail. vol. 3, pp. 284–327.

Traxler, Ralph, Asphalt–Its Composition, Properties and Uses, (1961) no month avail. p. 130.

*Primary Examiner*—David Brunsman
*Attorney, Agent, or Firm*—Philip Mendes da Costa Bereskin & Parr

[57] ABSTRACT

A paving asphalt cement for use in preparing a paving asphalt comprises from about 5 to about 90 weight % of a catalytically oxidized paving asphalt precursor, from about 10 to about 95 weight % of a unoxidized paving asphalt precursor and, from about 1 to about 25 weight % of a heavy vacuum gas oil.

14 Claims, No Drawings

METHOD FOR THE PRODUCTION OF IMPROVED PAVING ASPHALT AND PRODUCT PREPARED THEREFROM

FIELD OF THE INVENTION

This invention relates to paving asphalts. In one aspect, this invention relates to a method of modifying an asphalt so as to increase the temperature range over which the asphalt may be used.

BACKGROUND OF THE INVENTION

Asphalt has been used for preparing road surfaces for several decades. Typically, the main ingredients of a paving asphalt comprises an aggregate (which may comprise about 95 wt. % of the paving asphalt) and a paving asphalt cement (which may comprise about 5 wt. % of the paving asphalt). The asphalt cement is used to bind together the aggregate and limit its mobility when a load is applied.

Previously, paving asphalt cements have been graded on different basis in various countries. Pursuant to the ASTM Standard Specification for Penetration-Graded Asphalt Cement for Use in Paving Construction, asphalts were graded according to their penetration. Pursuant to the ASTM Standard Specification for Viscosity—Graded Asphalt Cement for use in Paving Construction, asphalts were graded according to their viscosity.

In U.S. Pat. No. 5,284,509, the applicant disclosed paving asphalt cements comprising a blend of a catalytically oxidized paving asphalt precursor and an unoxidized paving asphalt precursor. The patented process may be used to prepare paving asphalt having improved rutting resistance. At that time, the applicant recognized the limitations of penetration and viscosity to classify the performance of paving asphalts and developed its own test methodology to compare asphalts.

More recently, it has become more generally recognized in the industry that the use of penetration and viscosity to grade asphalt is not an accurate reflection of the actual field performance of a paving asphalt. For example, the American Association of State Highway and Transportation Officials has developed the Standard Specification for Performance Graded Asphalt Binder (the SHRP Grades). This standard grades asphalts according to their performance at an upper temperature and a lower temperature. The basis of this standard is that, by measuring the properties of a paving asphalt at the upper and lower temperatures and at an intermediate temperature to which paving asphalts may be exposed during use, the actual performance of the paving asphalt may be better predicted.

Despite the change in grading of paving asphalt, a problem still remains in producing paving asphalts which have the required performance. Paving asphalt cements have typically been manufactured from vacuum tower bottoms. In the past, paving asphalt cements have been prepared by careful selection of the crude oil from which the paving asphalt cement is to be made and the operating condition of the distillation towers used to prepare the vacuum tower bottoms. A disadvantage of this selection system is that a crude oil may not be available which will render a paving asphalt cement having the desired characteristics. Further, it may not be possible to alter the operating conditions of the distillation tower sufficiently to obtain vacuum tower bottoms having the required characteristics.

As an alternate approach, performance enhancers such as polymers and additives have been incorporated into asphalt cements to produce a paving asphalt cement meeting the selected grade. Examples of such polymeric performance enhancer are styrene butadiene styrene, ethylene vinyl acetate, styrene butadiene rubber and polyethylene. One disadvantage with this approach is that the incorporation of polymers into the asphalt cement may dramatically increase the cost of the resultant paving asphalt cement.

SUMMARY OF THE PRESENT INVENTION

In accordance with the instant invention, there is provided a paving asphalt cement for use in preparing a paving asphalt comprising from about 5 to about 90 wt. % of a catalytically oxidized paving asphalt precursor; from about 10 to about 95 wt. % of an unoxidized paving asphalt precursor; and, from about 1 to about 25 wt. % of a gas oil.

Preferably, the gas oil is a heavy vacuum gas oil. The heavy vacuum gas oil may have a viscosity at 100° C. in the range 5–60 cst and, preferably, 10–30 cst.

In accordance with another embodiment of the invention, a process for preparing a paving asphalt cement for use in preparing a paving asphalt having a preselected performance at a first temperature and a preselected performance at a second lower temperature comprising the steps of selecting a catalytically oxidized paving asphalt precursor to provide the preselected performance at the first temperature; selecting an unoxidized paving asphalt precursor and a gas oil to provide the preselected performance at the second temperature; and, blending the paving asphalt precursor, the unoxidized paving asphalt precursor and the gas oil to obtain the paving asphalt cement.

It has been surprisingly discovered that the addition of the gas oil to the paving asphalt cement actually increases the effective temperature range of the paving asphalt cement. In particular, at low temperatures (eg., the lowest temperature for the specified grade of asphalt) paving asphalt cements may demonstrate thermal cracking. Further, at intermediate temperatures in the temperature range of the specified grade, paving asphalt cements may demonstrate fatigue. The addition of the gas oil decreases the temperature at which the thermal cracking become problematic, thus decreasing the lowest temperature at which the asphalt may be used while still performing adequately at low temperatures. Further, the addition of the gas oil lowers the temperature at which the asphalt may suffer fatigue cracking. The catalytically oxidized component provides the paving asphalt with the desired high temperature performance (e.g. the resistance to deformation despite repeated loading at elevated temperatures). It has surprisingly been found that the addition of the gas oil not only assists in improving not only the low temperature performance of the paving asphalt (i.e. thermal cracking) but also the intermediate temperature performance of the paving asphalt (i.e. fatigue performance). Further, this occurs without deleteriously affecting the high temperature performance contributed by the catalytically oxidized paving asphalt precursor.

DESCRIPTION OF PREFERRED EMBODIMENT

As used herein, the term "paving asphalt precursor" is used to refer to any material known in the art which may be used to prepare paving asphalt or as a paving asphalt cement for paving asphalt. The paving asphalt precursor may be of varied character. As is known in the industry, a petroleum residuum or flux may be obtained by injecting a conventional or synthetic crude oil, for example at a temperature from about 650° to about 1100° F., into a fractionating column. The lighter fractions may be separated as overhead products. The residuum from the fractionating column may be a straight reduced asphalt cement. To date, crude oils typically may not be distilled at atmospheric pressure to produce a paving asphalt cement since a crude oil typically contains a high percentage of high boiling fractions. Accordingly, as a supplement to the atmospheric process, a second fractionating tower (a vacuum tower) is utilized. Once again, higher boiling components are drawn off from the vacuum tower and the tower bottoms may be used as paving asphalt cement. Such vacuum tower bottoms are known in the industry.

In the case of the paving asphalt precursor which is to be catalytically oxidized, suitable vacuum tower bottoms may have a penetration at 25° C. of from about 60 to about 600 or more. Above a penetration of about 400 or more, penetration is difficult to measure and is generally measured by extrapolation. Extrapolation is generally used in the industry up until a penetration of about 600. Above this level, penetration is not generally used in the classification of vacuum tower bottoms. Preferably, the vacuum tower bottoms have a penetration from about 100 to about 500 and, most preferably, from about 150 to about 400.

Preferably, the vacuum tower bottoms will be the softest material which has a minimal flash point above the temperature at which the catalytic oxidation is conducted. For example, when the catalytic oxidation is conducted at a temperature of about 205° C. (400° F.) to about 260° C. (500° F.) the vacuum tower bottoms preferably have a minimum flash point of about 260° C. (500° F.).

The catalytic oxidation process used in the present invention may be conducted in any manner which is known in the art. In the catalytic oxidation process, a paving asphalt precursor may be fed into a vessel and heated to a temperature which may be between about 205° C. (400° F.) and about 290° C. (550° F.). An oxidizing gas, such as air, is introduced into the paving asphalt precursor to oxidize the precursor in the presence of a catalyst. The process is carried out for a sufficient length of time to provide an oxidized asphalt cement having the desired penetration.

The catalyst may be any of those disclosed in U.S. Pat. Nos. 1,782,186, 2,450,756, 2,375,117 and 2,649,384. Further, the catalyst may be one of those disclosed in European Patent Application Number 0053041. The catalyst may be a phosphorous compound such as phosphorous pentoxide and phosphoric acid, a chloride such as the chlorides of zinc, iron, copper, antimony or aluminium, a sulphate such as zinc sulphate or aluminium sulphate, carbonates such as sodium carbonate, bicarbonate salts of sodium, calcium, magnesium, barium, strontium, lithium, ammonium, potassium, bismuth, lead, tetraalylophosphonium, tetraarylphosphonium, tetraalkylammonium, trialylammonium, dialkylammonium, transition metals or rare earth metals, boron trifluride, lead oxide, lead naphtathanate and sulphur. Preferably, the catalyst is phosporic acid, phosphorous pentoxide, ferric chloride or ferrous chloride and, more preferably, the catalyst is ferrous chloride or ferric chloride.

A catalytic amount of the catalyst may be used. The amount of catalyst which is used may very from 0.05–1 wt. % of dry catalyst based upon the total weight of the oxidized product. More preferably, 0.2–0.5 wt. % of dry catalyst is utilized. The catalytic oxidation will preferably be conducted at a temperature of from about 205° C. (400° F.) to about 290° C. (550° F.) and, more preferably from about 230° C. (450° F.) to about 260° C. (500° F.).

The amount of time required to catalytically oxidize the paving asphalt precursor will vary depending upon a number of factors including the type of crude oil from which the precursor is obtained, the consistency of the asphalt precursor, the temperature at which the catalytic oxidation is conducted, the air flow rate, the configuration of the oxidizing vessel and the amount of catalyst.

The catalytically oxidized component provides the high temperature performance of the paving asphalt. Accordingly, the particular vacuum tower bottom which is selected, and the degree to which it is catalytically oxidized, is determined by the required performance at the upper temperature range of the selected paving asphalt. For example, a paving asphalt having a grade of PG 58–34 has an average maximum pavement design temperature of 58° C., a minimum pavement design temperature of –34° C. and an intermediate design temperature of 16° C. To meet this grade, a paving asphalt must meet the PG performance requirements at all three temperatures. Accordingly, the catalytically oxidized paving asphalt precursor is selected to provide the requisite performance at the average maximum pavement design temperature of 58° C.

The unoxidized paving asphalt precursor may also be any material known in the art which may be used to prepare paving asphalt or as a paving asphalt cement for paving asphalt. The unoxidized paving asphalt precursor may be the same as the paving asphalt precursor which is catalytically oxidized to produce the catalytically oxidized paving asphalt precursor. The paving asphalt precursor which comprises the unoxidized component may be a vacuum tower bottom from a vacuum tower. Suitable vacuum tower bottoms may have a penetration at 25° C. of about 60 to about 600 or more, more preferably from about 100 to about 500 and, most preferably from about 150 to about 400.

The unoxidized vacuum tower bottom is softer than the catalytically oxidized paving asphalt precursor and is selected to provide the required performance characteristics at the minimum pavement design temperature. For example, if the paving asphalt has a grade of PG 58–34, then the unoxidized paving asphalt precursor assists in providing the requisite performance at –34° C.

In accordance with the instant invention, the paving asphalt cement also comprises a gas oil. Preferably, the gas oil is a heavy vacuum gas oil. Such products may be semi-solid or liquid at room temperature. The gas oil may have a viscosity at 100° C. as measured by ASTM D2170/D445 of from about 5 to about 60 cst and, preferably, from about 10 to about 30 cst. Such gas oils are lighter than the vacuum tower bottoms and have been used in the past to produce higher value (e.g. lighter) products. Accordingly, such fractions may have been drawn off from the vacuum tower and recycled therethrough to produce other products or, alternately, subjected to further processing such as catalytic cracking. Surprisingly, despite the fluid characteristics of these materials at room temperature (they may be liquid or semi-solid), they may form part of a paving asphalt cement which still maintains good performance characteristics at the average maximum design temperature.

The heavy gas oil and the unoxidized paving asphalt precursor are selected to provide the required lower temperature performance—for example, in terms of the SHRP standard, the performance at the intermediate and/or minimum design temperatures. Accordingly, the amount of heavy vacuum gas oil which is added will vary depending upon, for example, the penetration of the unoxidized paving asphalt precursor and the viscosity of the gas oil. One advantage of the instant invention is that a wider variety of unoxidized paving asphalt precursors may be utilized to produce a paving asphalt having the preselected grade. For example, if an unoxidized paving asphalt precursor has a penetration that is too low for use in preparing a selected grade of asphalt, by including a heavy vacuum gas oil in the asphalt cement, it may be possible to use the unoxidized paving asphalt precursor to produce a paving asphalt having the selected grade.

The components of the paving asphalt of the instant invention, namely the catalytically oxidized paving asphalt precursor, the unoxidized paving asphalt precursor and the heavy vacuum gas oil may be blended together in any particular order. Accordingly, the unoxidized paving asphalt precursor and the gas oil may be blended together and subsequently the catalytically oxidized paving asphalt precursor may be blended therewith. Alternately, all three components may be blended together at the same time.

The paving asphalt cement may comprise from about 5 to about 90 wt. % of the catalytically oxidized paving asphalt precursor, more preferably from about 10 to about 70 wt. % and, most preferably from about 15 to about 50 wt. %. The paving asphalt cement may comprise from about 10 to about 95 wt. % of the unoxidized paving asphalt precursor, more preferably from about 30 to about 85 wt. % and, most preferably from about 40 to about 75 wt. %.

The paving asphalt cement may comprise up to about 25 wt. % of the gas oil and more preferably from about 5 to about 15 wt. %.

The amount of catalytically oxidized paving asphalt precursor which is used will vary depending upon the amount of gas oil which is incorporated into the paving asphalt cement. For example, as greater amounts of the heavy vacuum gas oil are added, additional amounts of the catalytically oxidized paving asphalt precursor may be required to maintain the high temperature performance of the paving asphalt. The increased amount of catalytically oxidized paving asphalt precursor which may be required may vary from about 1 to about 40, more preferably from about 3 to about 25% and, most preferably from about 5 to about 15%. Accordingly, despite the addition of the heavy gas oil into the blend, only relatively small additional amounts of the catalytically oxidized component may need to be added.

It will be appreciated that various changes and modifications may be made and be within the scope of this invention. For example, the paving asphalt precursor which is to be catalytically oxidized may be blended with other hydrocarbon compounds prior to being catalytic oxidation. Further, the paving asphalt may have other compounds included therein such as performance enhancers.

We claim:

1. A process for decreasing the thermal cracking temperature of a paving asphalt cement for use in preparing a paving asphalt comprising the steps of:
    (a) selecting a catalytically oxidized paving asphalt precursor to provide performance at a first temperature;
    (b) selecting an unoxidized paving asphalt precursor and a gas oil to provide performance at a second temperature; and,
    (c) blending said catalytically oxidized paving asphalt precursor, said unoxidized paving asphalt precursor and said gas oil to obtain the paving asphalt cement.

2. The process as claimed in claim 1 wherein said paving asphalt comprises:
    (a) from about 5 to about 90 weight % of said catalytically oxidized paving asphalt precursor;
    (b) from about 10 to about 95 weight % of said unoxidized paving asphalt precursor; and,
    (c) the remainder comprises said gas oil.

3. The process as claimed in claim 2 wherein said gas oil is a heavy vacuum gas oil.

4. The process as claimed in claim 3 wherein said gas oil has a viscosity at 100° C. from about 5 to about 60 cst.

5. The process as claimed in claim 4 wherein said paving asphalt cement comprises from about 10 to about 70 weight % of said catalytically oxidized paving asphalt precursor and from about 30 to about 85 weight % of said unoxidized paving asphalt precursor.

6. The process as claimed in claim 3 wherein said gas oil has a viscosity at 100° C. from about 10 to about 30 cst.

7. The process as claimed in claim 1 wherein said gas oil is a heavy vacuum gas oil.

8. The process as claimed in claim 7 wherein said gas oil has a viscosity at 100° C. from about 5 to about 60 cst.

9. The process as claimed in claim 7 wherein said gas oil has a viscosity at 100° C. from about 10 to about 30 cst.

10. The process as claimed in claim 9 wherein said paving asphalt cement comprises from about 10 to about 70 weight % of said catalytically oxidized paving asphalt precursor, from about 30 to about 85 weight % of said unoxidized paving asphalt precursor and the remainder comprises said gas oil.

11. A process for preparing a paving asphalt cement comprising the steps of:
    (a) providing a catalytically oxidized paving asphalt precursor to provide performance at a first temperature;
    (b) providing an unoxidized paving asphalt precursor
    (c) providing a gas oil to decrease the thermal cracking temperature of the paving asphalt cement; and,
    (d) blending said catalytically oxidized paving asphalt precursor, said unoxidized paving asphalt precursor and said gas oil to obtain the paving asphalt cement to produce an asphalt having a SHRP grade of PG 58–34.

12. The process as claimed in claim 11 wherein said gas oil is a heavy vacuum gas oil.

13. The process as claimed in claim 11 wherein said gas oil has a viscosity at 100° C. from about 5 to about 60 cst.

14. The process as claimed in claim 11 wherein said gas oil has a viscosity at 100° C. from about 10 to about 30 cst.

* * * * *